United States Patent Office 3,245,977
Patented Apr. 12, 1966

3,245,977
EPOXIDIZED CONDENSATION PRODUCT OF A CONJUGATED DIENE AND A POLYALKYL AROMATIC COMPOUND
Donald K. George, Baltimore County, and Louis T. Gunkel, Pasadena, Md., assignors to FMC Corporation, a corporation of Delaware
No Drawing. Filed June 16, 1961, Ser. No. 117,512
10 Claims. (Cl. 260—94.7)

This invention relates to a new class of curable polymers containing oxirane oxygen, to their method of manufacture, and to the cured resinous compositions produced therefrom, useful in the arts of moldings, coatings, laminates, adhesives and the like.

A variety of types of polymers containing oxirane oxygen are known, and some of these polymers have achieved wide and varied use due to the reactivity of their oxirane oxygen functionality with a variety of types of compounds. Each type of epoxy polymer (as oxirane containing resins are commonly called), has its particular uses, advantages and disadvantages. There is a continuing need for improved epoxy polymers, particularly those of enhanced workability and versatility in the uncured state and of improved properties when cured.

The novel compositions of the present invention are oxirane containing resins which are epoxidized condensation products of conjugated dienes with polyalkyl-aromatic compounds, wherein such condensation products contain an average of at least two molar equivalents of diene residue per molar equivalent of polyalkyl-aromatic residue. These new epoxy resins are characterized by a number of interesting and useful advantages, not only as formed, but in the cured compositions produced by cross-linking these resins by reacting the epoxy groups with polyfunctional curing agents.

These new epoxy resins may be produced to contain a relatively high oxirane oxygen content product, for which the viscosity may be adjusted to fall within a wide range, from very low to very high, thus providing an extremely versatile class of new epoxy resins. In addition to this versatility, these resins are characteristically of lower viscosity, for a given molecular weight range and oxirane oxygen content, than corresponding epoxy polydiolefins, providing products of greatly enhanced utility as compared with related types of epoxy resins. Compared with previously available epoxy resins, the resins of this invention provide improved workability, enhanced wetting and impregnation of porous materials, better filling of voids and higher filler loading in molding and casting applications, longer pot life before curing, and lower exotherm during cure. When cured by reacting with cross-linking agents, of which a wide variety may be used, new products of exceptional utility and versatility are obtained, useful in laminating, casting, potting and coating applications.

In preparing the novel resins of this invention, initially a polymeric condensation product is prepared by reacting a conjugated diolefin with a polyalkyl-aromatic compound. The diene and the polyalkyl-aromatic compound are condensed or copolymerized so that the resulting product has an average composition of at least two residues of the diene reactant for each one of polyalkyl-aromatic compound, said diene residues reacting primarily on the alkyl side chain of the polyalkyl-aromatic compound, to produce an essentially linear product. Methods for preparing this type of polymer are well known in the art.

The conjugated diolefin employed herein preferably contains four to eight carbon atoms and includes such dienes as butadiene, isoprene, 2,3-dimethylbutadiene, cyclopentadiene, methylcyclopentadiene, cyclohexadiene-1,3, octadienes, and other conjugated unsaturated hydrocarbons having straight or branched chains.

The polyalkyl-aromatic compound employed herein contains at least one aromatic nucleus, and is preferably an alkylated benzene or naphthalene derivative containing at least two alkyl groups attached to the aromatic nucleus. Polyalkyl-aromatic compounds useful herein include xylene, including ortho-, meta-, and para-xylenes and mixtures thereof, mesitylene, tetralin, diethylbenzene, ortho-, meta-, and para-cymene, polymethyl naphthalenes, durene, and the like. Heterocyclic polyalkyl-aromatic compounds, such as lutidine and dimethylpyrrole, may also used. Mixtures of polyalkyl-aromatic compounds may be employed, to provide products having particular properties, and/and for reasons of economy and availability. The alkyl substituents on the aromatic ring preferably contain one to three carbon atoms in each alkyl chain, although chains of greater length may be used if desired to produce products having particular properties. For convenience and economy, it is preferred to employ polymethyl aromatic hydrocarbons such as the isomeric xylenes, mesitylenes and methylated naphthalenes.

The condensation of the diene with the polyalkyl-aromatic compound is accomplished by known techniques. These condensation products contain residual reactive double bonds, derived from condensation of the diene with itself and with the alkyl groups on the aromatic compounds. When these residual unsaturated groups are epoxidized, oxirane oxygen functionality is introduced on the copolymer chains.

The novel epoxidized copolymers which are the subject of this invention contain at least 1% by weight of epoxy oxygen, and preferably about 4 to 10% epoxy oxygen by weight. Epoxy copolymers containing a relatively high concentration of epoxy oxygen tend to be extremely viscous, especially in the higher molecular weight ranges; but this may actually be desired for special applications, such as coatings. In practice, the maximum epoxy oxygen content of these resins is about 12% by weight. The viscosity of the epoxy copolymer depends on such factors as the molecular weight and viscosity of the unepoxidized copolymer and the degree of epoxidation; and, of course, the viscosity of a particular epoxy resin may be lowered by the use of solvents or diluents.

The novel epoxy resins provided herein are believed to have a structure consisting of a central polyalkyl-aromatic residue having a multiplicity of condensed diene units attached thereto and polymerized onto some or all of the alkyl groups, and in which a portion of the residual unsaturated bonds in the diene units has been converted to epoxy groups. The diene residues present in the copolymers of this invention are believed to be coupled partly by 1,4-linkages, which provide residual unsaturated bonds in the body of the copolymer chains, and partly by 1,2-linkages, which provide residual external unsaturated bonds, in the form of vinyl groups, on the copolymer chains. Therefore, these epoxidized copolymers contain both internal and external epoxy groups, and usually some residual olefinic unsaturation, the amount of residual unsaturation varying inversely with the degree of epoxidation.

In preparing these condensation products, the ratio of the diene and the polyalkyl-aromatic starting materials may be varied within wide limits. It is preferred that at least two moles of diolefin be reacted per mole of polyalkyl-aromatic compound. When less than a two molar excess of diolefin is reacted, a portion of the product consists of low molecular weight condensates and possibly unreacted polyalkyl-aromatic starting material. Although such low molecular weight products may actually be desired for special applications, or to lower the viscosity of higher molecular weight product, in general it is preferred that the product contain an average of at least two moles of diolefin per mole of polyalkyl-aromatic compound.

In general, it has been found that the beneficial aspects of the instant invention are marked when about 10% to 50% by weight of the final product is derived from the polyalkyl-aromatic compound. This is roughly equivalent to a 2 to 18 molar excess of diene over aromatic compound. At substantially more than an 18 molar excess of diene the properties of the condensation product approach those of the polydiene itself, at the expense of many of the advantages of the instant invention. But within the stated limits, the ratio of the diene and the aromatic compound may be varied over a considerable range, depending on the particular properties desired in the expoxidized and cured products.

The condensation is conveniently accomplished using a finely divided alkali metal catalyst, such as sodium, potassium, or lithium, or a mixture of alkali metals, or their alloys, at elevated temperatures. Alkali metal hydride catalysts are also effective in this reaction, and other catalysts for the preferential reaction of the olefin with the alkyl side chain rather than the aromatic ring. For reasons of economy, sodium is a preferred catalyst. Rapid conversion is obtained using a catalytic amount of finely divided sodium, in mass or solution polymerization, by known techniques for sodium catalyzed polymerization. For example, sodium may be dispersed in an inert hydrocarbon diluent such as benzene or kerosene, in the presence or absence of a dispersing agent. If desired, the catalyst may be suspended in a polyalkyl-aromatic compound such as xylene, for ultimate incorporation into the polymeric structure. Useful methods of preparing catalysts for this reaction are well known in the art.

The amount of polymerization catalyst employed may be varied, depending on the desired properties of the product, but normally is in the range of 0.1 to 10 parts of catalyst per 100 parts of diene monomer. Excellent results are normally obtained in the range of 3 to 5 parts catalyst per 100 parts of diene monomer. The catalyst may be dispersed in an inert solvent for the reactants, such as benzene, aliphatic hydrocarbons such as petroleum ether, decalin and the like. In general, it is convenient to employ solvents boiling in the range of 50–150° C., although the boiling range of the solvent is not critical. Normally a solvent is used which can be distilled or otherwise stripped from the reaction mix after polymerization. As previously stated, bulk polymerization in the absence of added solvent or diluent may also be carried out, whereby the catalyst is dispersed in the polyalkyl-aromatic compound, which compound is then incorporated into the product during the polymerization reaction.

The condensation reaction generally occurs at temperatures above about 75° C., the reaction temperature being selected to produce condensation products in the desired molecular weight range. When the diolefin is a gas, or when it is desired to conduct the reaction under superatmospheric pressure, the reaction is conveniently carried out in an autoclave, by introducing therein the starting hydrocarbons and the catalyst, and heating the reaction mixture to a temperature between about 75° and 200° C. for several hours, preferably while agitating the mixture. After the polymerization reaction has proceeded to the desired point, conveniently measured, for example, by the viscosity of the reaction mixture, or by the consumption of a gaseous reactant, if any, or by removing and testing a sample of the product, the mixture is cooled or otherwise quenched, and catalyst, diluent and unreacted monomers if any are removed, all by standard procedures. The catalyst is conveniently removed by washing with water or acid, and volatile materials are readily distilled.

The resulting polymeric condensation product of the diene with the polyalkyl-aromatic compound is an oily to viscous liquid. It is primarily linear in structure and contains residual olefinic unsaturation, normally characterized by an iodine number in the range of about 250 to 400. The molecular weight of these condensation products is generally in the range of about 250 to 1000, corresponding to a viscosity range of about 0.5 to 10 poises at zero shear and 25° C. Should it be desired to prepare polymers for epoxidation to a relatively low epoxy content, polymers of higher viscosity and molecular weight may be desired, and are readily prepared by conventional modifications of these standard polymerization procedures.

For the expoxidation of these copolymers, standard techniques may be employed. Aliphatic, aromatic and inorganic peracids, salts of the peracids, peroxides and hydroperoxides are the most common of the effective epoxidizing agents. For convenience, lower aliphatic peracids, such as performic, peracetic, perpropionic and perbutyric are preferred reagents. With these reagents, the epoxidation reaction may be carried out using a preformed peracid, or the peracid may be formed in the reaction medium, generally by adding hydrogen peroxide to an alpihatic acid or anhydride medium. Peracids may be prepared in any known way, such as is described in "Organic Syntheses," Coll. Volume I, Second Edition, John Wiley and Sons (1941), page 431. An epoxidation catalyst may also be employed, such as a small amount of a strong acid, or a cation exchange resin as described by Gall and Greenspan, Ind. Eng. Chem. 47, 147–8 (1955). Normally a solvent for the copolymer, such as chloroform, benzene, xylene and the like, is present during the epoxidation. The amount of available active oxygen employed in the epoxidation reaction is that necessary to produce the desired oxirane-oxygen content of the epoxidized copolymer. In practice, an excess of active oxygen above that theoretically required may be used, to compensate for losses due to decomposition of the oxidant and/or ring opening of the oxirane groups on the polymer.

When these epoxidized copolymers are cured by reacting with cross-linking agents, the products are hard, tough, infusible resins which are useful in a variety of ways, as in the potting and encapsulating of electronic assemblies and in other casting applications, as adhesives, in decorative and structural laminates, in protective coatings, and in many other resinous applications, either alone or in combination with other resins.

Useful curing agents herein include polycarboxylic acids and anhydries, polyamines, combinations of anhydrides and polyols, anhydride-polyol adducts, polymercaptans, urea-formaldehyde adducts, Lewis acids and Lewis acid complexes, and many more simple and complex structures containing more than one group which reacts with oxirane oxygen. Further, these epoxy polymers may be extended with vinyl and allyl monomers and cured with the curing agents described above in the presence of peroxide catalysts, to produce homogeneous, hard, tough, infusible products having particular properties for particular uses.

Polycarboxylic anhydrides which may be used to react with and cure the novel epoxy polymers of this invention, to form novel, cross-linked resinous products, include aliphatic dicarboxylic acid anhydrides, such as succinic anhydride, glutaric anhydride, propylsuccinic anhydride, methylbutylsuccinic anhydride, hexylsuccinic anhydride, pentenylsuccinic anhydride, ocetenylsuccinic anhydride, nonenylsuccinic anhydride, alpha, betadiethylsuccinic anhydride, maleic anhydride, chloromaleic anhydride, dichloromaleic anhydride, itaconic anhydride, citraconic anhydride; cycloaliphatic dicarboxylic acid anhydrides, such as hexahydrophthalic anhydride, hexachlorophthalic anhydride, tetrahydrophthalic anhydride, methyltetrahydrophthalic anhydride, tetrachlorphthalic anhydride; hexachloroendomethylenetetrahydrophthalic anhydride, endomethylene tetrahydrophthalic anhydride; aromatic dicarboxylic acid anhydrides, such as phthalic anhydride, 4-nitrophthalic anhydride, 1,2-naphthalic anhydride, 1,8-naphthalic anhydride, 2,3-naphthalic anhydride; tetracarboxylic acid dianhydrides, such as 1,2,4,5-benzenetetracarboxylic dianhydride; polymeric dicarboxylic acid anhydrides, such as those prepared by the autocondensation of dicarboxylic acids, for example adipic acid, pimelic acid, sebacic acid, hexahydroisophthalic acid, terephthalic acid, isophthalic acid, and the like. Other useful dicarboxylic acid anhydrides include the Diels-Alder adducts of maleic acid and aliphatic compounds having conjugated double bonds. Preferred polycarboxylic acid anhydrides are the aliphatic hydrocarbon dicarboxylic acid anhydrides, the cycloaliphatic hydrocarbon dicarboxylic acid anhydrides and the aromatic hydrocarbon dicarboxylic acid anhydrides.

Polycarboxylic compounds which may be used in the compositions of this invention are compounds which contain two or more free carboxy groups per molecule. Representative polycarboxylic compounds are polycarboxylic acids including such dicarboxylic acids as oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic acid, fumaric acid, itaconic acid, citraconic acid, mesaconic acid, glutaconic acid, ethylidenemalonic acid, isopropylidenemalonic acid, allylmalonic acid, muconic acid, alpha-hydromuconic acid, beta-hydromuconic acid, diglycolic acid, dilactic acid, dithioglycolic acid, 4-amyl-2,5-heptadienedioic acid, 3-hexynedioic acid, 4,6-decadiynedioic acid, 2,4,6,8-decatetraenedioic acid, 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, tetrahydrophthalic acid, tetrachlorphthalic acid, 1,8-naphthalenedicarboxylic acid, 3-carboxycinnamic acid, 3-carboxycinnamic acid, 1,2-naphthalenedicarboxylic acid, and the like; tricarboxylic acids, such as 1,1,5-pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,2,4-benzenetricarboxylic acid, 1,3,5-benzenetricarboxylic acid, and the like; tetracarboxylic acids, such as 3-hexene-2,2,3,4-tetracarboxylic acid, 1,2,3,4-benzenetetracarboxylic acid, 1,2,3,5-benzenetetracarboxylic acid, 1,2,4,5-benzenetetracarboxylic acid, and the like; pentacarboxylic acids, such as benzenepentacarboxylic acid; and hexacarboxylic acids, such as benzenehexacarboxylic acid and the like. Preferred polycarboxylic acids include aliphatic hydrocarbon dicarboxylic acids, cycloaliphatic hydrocarbon dicarboxylic acids and aromatic hydrocarbon dicarboxylic acids.

Among the polycarboxylic compounds which can be used are compounds containing ester groups and two or more carboxyl groups and can be aptly termed polycarboxy polyesters of polycarboxylic acids, such as those listed above, or the corresponding anhydrides of said acids, with polyhydric alcohols. By the term "polycarboxy polyesters," as used herein, is meant polyesters containing two or more free carboxy group per molecule. These polycarboxy polyesters can be prepared by known condensation procedures, employing mole ratios favoring greater than equivalent amounts of polycarboxylic acid or anhydride. More specifically, the amount of polycarboxylic acid or anhydride, employed in the esterification reaction should contain more carboxy groups than are required to react with the hydroxyl groups of the polyhydric reactant. In forming polycarboxy polyesters that are useful in the compositions of this invention, it is preferable to use hydrocarbon dicarboxylic acids or anhydrides. Adducts of anhydrides and polyols useful as curing agents include bis and tris half esters of polyols with aliphatic and aromatic polycarboxylic acid anhydrides, prepared by reacting one molar equivalent of anhydride with each equivalent of polyol hydroxyl group; and acid-terminated polyesters, obtained by reacting anhydrides with polyols using molar ratios of anhydride to polyol greater than one.

Polyhydric alcohols which can be employed in preparing these polycarboxy polyesters include dihydric alcohols, such as ethylene glycol, diethylene glycol, triethylene glycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, pentane-1,5-diol, pentane-2,4-diol, 2,2-dimethyltrimethylene glycol, hexane-1,4-diol, hexane-1,5-diol, hexane-1,6-diol, hexane-2,5-diol, 3-methylpentane-1,5-diol, 2-methylpentane-2,5-diol, 3-methylpentane-2,5-diol, 2,2-diethylpropane-1,3-diol, 2-ethylhexane-1,3-diol, 2,5-dimethylhexane-2,5-diol, octadecane-1,12-diol, 1-butene-3,4-diol, 2-butene-1,4-diol, 1,5-hexadiene-4,5-diol, 2-butyne-1,4-diol, 2-hexyne-2,5-diol, 2,5-dimethyl-3-hexyne-2,5-diol, and the like; trihydric compounds such as glycerol, trimethylolmethane, hexane-1,2,6-triol, 1,1,1,-trimethylolpropane, and the like; tetrahydric compounds, such as pentaerythritol, diglycerol, and the like; and higher polyhydric compounds such as pentaglycerol, dipentaerythritol, polyvinyl alcohols, alkalene oxide adducts of bis-phenols, and the like. Additional polyhydric alcohols useful in making polycarboxy polyesters can be prepared by the reaction of epoxides, e.g., diglycidyl ethers of 2,2-propane bis-phenol, and reactive hydrogen-containing organic compounds, e.g., amines, polycarboxylic acids, polyhydric compounds and the like. In forming the polycarboxy polyesters that can be employed in the compositions of this invention it is preferable to use a dihydric, trihydric or tetrahydric aliphatic or oxa-aliphatic alcohol.

In preparing polycarboxylic polyesters useful in the compositions of this invention, the mole ratios in which the polycarboxylic acid or anhydride is reacted with polyhydric compounds are those which provide polyesters having more than one carboxy group per molecule; and in the case of trifunctional and tetrafunctional reactants in the esterification reaction, the mole ratios of the respective reactants must of course be such as to avert gelation during esterification.

The polycarboxy polyesters described above are thus obtained by condensing, in accordance with known procedures, a polyhydric compound and a polycarboxylic acid or anhydride. This condensation reaction may be conducted, for example, by heating the reactants to a temperature within the range of 100° C. to 200° C., with or without an acidic catalyst. Water formed in the condensation reaction may be removed by distillation. The course of the reaction may be followed by making acid number determinations, and the reaction can be stopped when a suitable polycarboxy polyester has been obtained.

The acids and anhydrides useful for this invention may be liquids or solids although, for convenience, acids and anhydrides which are liquids, low melting solids and highly soluble solids are preferred. High-melting slightly soluble acids and anhydrides such as trimellitic acid, pyromelletic dianhydride and diglycolic acid may be used by intimately mixing with the resin and curing at an elevated temperature, which causes reaction and solution of curing agent.

Since acids and anhydrides cure the resin both by reaction with the epoxy groups and by catalyzing self-condensation of the epoxy groups, a wide range of weight ratios of curing agent to resin may be used to produce useful properties. When very small amounts of strong acid curing agents are used, the predominant curing reaction will be self-condensation and when large ratios of curing agent to resin are used, a greater amount of chemical reaction between the curing agent and the epoxy groups will occur. Low ratios of curing agent to resin will usually require longer cure cycles or somewhat higher curing tempearture than when large ratios are used. In many cases the use of only small amounts of acid curing agents is desired in order to provide more flexible cured products having increased impact resistance and resistance to thermal shock. For most applications, molar ratios of curing agent carboxylic acid groups to epoxy groups in the range of 0.1 to 1 are used, although higher and lower ratios may be desired for some uses.

Acidic and basic catalysts may not be necessary to carry out curing although they may be employed, as desired, to promote a more rapid cure. These catalysts can be added to the polymerizable compositions in amounts of .001 to 5 weight percent based upon the total weight of compositions. Basic catalysts which may be employed include pyridine, aniline, benzyldimethylamine, benzyltrimethylammonium hydroxide, dilute alkali hydroxides, and the like. Suitable acidic catalysts include sulfuric acid, phosphoric acid, perchloric acids, and Friedel-Crafts catalysts, e.g., stannic chloride, zinc chloride, ferric chloride, boron trifluoride, aluminum chloride, and the like.

As a separate curing system from the carboxyl-terminated polyesters discussed above, polycarboxylic acid anhydrides may be used in combination with polyols, in the absence of prior esterification of these components. Useful polyols and anhydrides for such systems are those previously described. When polyols are included in the anhydride cure formulation, the reaction rate is usually increased and the fluidity of the resin formulation is improved, as is the wettability of fillers and laminating fabrics. This use of polyols also usually causes a decrease in brittleness of the cured products.

For best results, the amount of anhydride used should be at least equivalent to the amount of aliphatic polyol used. By equivalent amount is meant equivalent number of reactive groups; thus a simple anhydride contains two reactive groups, and a glycol contains two reactive groups. It is usually preferred to use excess anhydride equivalents over polyol equivalents for best results. When equivalent amounts of anhydride and polyol are used the rate of cure is lower, but may be accelerated with an acid catalyst. When excess polyol is used, a reasonable rate of cure may still be obtained by using an acid catalyst, but the properties of the products are in general inferior. With lower aliphatic glycols and aliphatic dicarboxylic anhydrides, it has been found that best results are generally obtained in the range of about 3 to 4 equivalents of anhydride per equivalent of glycol, although good results have also been obtained using a large excess of anhydride and even at 9 or 10 excess anhydride equivalents improved products have resulted, at a very rapid reaction rate.

The total amount of combined anhydride plus polyol required for optimum properties in the cured epoxy polymer composition depends both on the degree of epoxidation of the polymer and on the particular curing combination used. In general, one epoxide equivalent of epoxy polymer, that is, the amount of epoxy polymer containing one atom of epoxy oxygen, requires a total amount of anhydride plus polyol containing at least one equivalent of reactive groups. As previously defined, a simple anhydride and a simple glycol each contains two reactive groups, and thus each contains two equivalents of reactive groups—a simple anhydride plus a simple glycol, combined, contain a total of four reactive groups. As the amount of total anhydride plus polyol used in the curing system is increased, the flexural strength, tensile strength, heat stability and other properties of the cured product are improved. Excellent results are obtained when a total of about 1.25 to 2.5 equivalents of total reactive groups in the polyol and anhydride are used per atom of epoxy oxygen in the polymer, and useful products are obtained in the range of about 0.5 to over 4 equivalents of reactive groups in the curing agent per atom of epoxy oxygen.

It has further been found that improved products for specific uses are obtained when unsaturated anhydrides containing polymerizable double bonds are employed in the curing system, along with a peroxide catalyst. These usaturated anhydrides may be combined in polyesters, or used in combination with polyols or alone. Vinyl monomers may be present or absent in all of these systems. Such products often exhibit enhanced thermal stability and cure rates, as well as improved stability and resistance to the action of solvents, boiling water, high temperatures, and weathering are obtained. As an additional advantage, the epoxy polymer used may be of lower epoxy content and higher unsaturation than may otherwise be necessary to obtain cured products of optimum properties.

As the anhydride component of this curing system, a wide variety of unsaturated polycarboxylic anhydrides containing reactive double bonds may be used, alone or in combination with each other or with saturated anhydrides. Typical reactive unsaturated anhydrides include maleic, monosubstituted maleic such as chloromaleic and citraconic, itaconic, bicyclo-(2,2,1)-5-heptene-2,3-dicarboxylic, bicyclo - (2,2,1) - 5 - methyl - 5 - heptene-2,3-dicarboxylic and many other unsaturated anhydrides having reactive double bonds, of varied structure and properties.

These anhydrides may be used in combination with other aliphatic, alicyclic and aromatic polycarboxylic anhydrides, to prepare compositions having specific curing characteristics and cured properties. For example, compositions may be prepared where as much as 95% of the anhydride component consists of a saturated anhydride, or an anhydride containing relatively unreactive double bonds, since the presence of even 5% of reactive double bonds in the anhydride contributes substantially to the improved properties of the product. Typical anhydrides in combination include succinic, dodecenylsuccinic, octenylsuccinic, di- and tetrachlorophthalic, tetrahydrophthalic, hexahydrophthalic, dichloromaleic, pyromellitic, bicyclo-(2,2,1)-5-hetene-1,4,5,6,7,7 - hexachlor - 2,2 - dicarboxylic, and many others. The corresponding di- or polycarboxylic acids may be used in place of all or a portion of the anhydrides to increase the rate of cure. Again, substituents such as halogen or other groups may be incorporated for special applications.

If a polyol is employed with the unsaturated anhydride, it is preferably an aliphatic polyhydric alcohol, as previously discussed, including the glycols and glycol ethers, and long chain diols of straight and branched chains, which chains may contain aromatic rings, such as xylylene glycol and dimethylxylylene glycol. Higher polyols such as glycerol, pentaerythritol, polyallyl alcohol, sorbitol, trimethylolbenzene and many others may also be used, as well as a large number of other dihydroxy and polyhydroxy compounds. Unsaturated polyols, such as 2-butene-1,4-diol, dihydroxycyclopentene and tetrahydroxycyclohexene are also useful herein, and if the unsaturated polyol contains reactive double bonds this polyol may be used in combination with or in place of the unsaturated function of the anhydride. Substituents such as halogen, nitro, amido or other functional groups may also be incorporated to impart particular properties to the product.

The free radical initiating agent may be any agent which is stable below the curing temperature, but which liberates free radicals into the system under the curing conditions. These free radical initiators are of the same type as is normally used in the catalysts of free radical polymerization reactions, the most common of which are peroxygen compounds, such as aliphatic, aromatic and inorganic peracids, salts and esters of the peracids, peroxides and hydroperoxides. It is preferred herein to use organic peroxy compounds which are compatible with and soluble in the other components of the curing system. Examples of such peroxides include t-butyl perbenzoate, benzoyl peroxide, dicumyl peroxide, 2,5-bis(tert.-butylperoxy)-2,5-dimethylhexane, methyl ethyl ketone peroxide, di-t-butyl diperphthalate, di-t-butyl peroxide, p-menthane hydroperoxide, acetyl peroxide, 2,2'-azo-bis-isobutyronitrile, pinane hydroperoxide, 2,5-dimethylhexane-2,5-dihydroperoxide, cumene hydroperoxide, cyclohexane peroxide, and many others. Peroxidated diene-polyalkyl aromatic condensation products may also be used as the catalyst.

The decomposition temperatures of such free radical initiators may be in the broad range of about 25 to 200° C., since the anhydride or polyol-anhydride cure systems are readily formulated as to be reactive throughout this range. Most of the peroxides listed above are active in the preferred range of 75°–175° C., since this is a convenient temperature range for obtaining completely cured products within a reasonable time. If curing is to be effected in two or more staages by progressively increasing the temperature, a combination of two or more appropriately selected free radical initiators may be used. The decomposition of the peroxide is promoted by the use of various well-known additives, typically acids or amines such as phosphoric acid, cobalt naphthenate, dimethyl aniline and boron trifluoride. The decomposition temperature is, in fact, progressively lowered during the curing step by acid formed during the reaction.

The amount of free radical initiator used may vary over a wide range, and from 0.01% to 5% of peroxide, by weight of total curing agent may be used. In general, excellent results are obtained in a preferred range of about 0.2% to 2% of peroxide. When less than an effective amount of peroxide is present, the results are the same as if the anhydride-polyol system alone were used. There is no advantage to the use of excess peroxide, and in fact large excesses should be avoided, to avoid contamination of the polymer with residues of the peroxide.

Included in these formulations containing unsaturated anhydrides or acids and peroxides may be reactive vinyl and allyl monomers, often but not necessarily used in the typical anhydride/polyol systems previously described. Useful vinyl and allyl monomers are typified, for example, by xinyl aromatic monomers such as styrene, alpha-methyl styrene, vinyl toluene, divinyl benzene and the like; cyclic compounds such as dicyclopentadiene; unsaturated esters such as methyl methacrylate; common vinyl monomers such as acrylonitrile; and allyl monomers such as triallyl phosphate, diallyl phthalate, dimethallyl maleate, and many other reactive monomers.

Without intending to be limited to any particular curing mechanism, it appears as if the vinyl or allyl monomer copolymerizes with the unsaturated anhydride, and that this copolymerization is accompanied by interaction with the residual double bonds in the epoxy polymer to form a terpolymer based on addition polmerization, which polymerization occurs concurrently with condensation interaction among the anhydride, polyol if any, and epoxy groups. Thus the amount of vinyl monomer which is employed in the curing formulation depends somewhat on the degree of residual unsaturation in the particular epoxy resin, and on the specific polymerization characteristics of the unsaturated anhydride. Best results are generally obtained in the range of about 30 to 60 parts vinyl or allyl monomer per 100 parts epoxy polymer.

Mixing of the components should of course be carried out at a temperature below the decomposition point of the peroxide, or below the temperature at which the curing reaction in thermally initiated. In other words the peroxide used in the curing formulation should be so selected that it does not decompose at the temperatures at which it is desired to prepare and, if necessary, store the composition before curing. An inhibitor may be used to prevent premature thermal or photochemical initiation of the polymerization.

The curing reaction is preferably carried out at low to moderate temperatures, to facilitate control of the reaction rate, which increases with increased temperature. A useful procedure is to allow the coposition to stand for a brief period at temperatures between about 0° C. and 75° C., and then to raise the temperature to about 75° C. to 175° C. to complete the reaction.

The epoxidized diene-polyalkyl aromatic condensation product of this invention may also be cured by reacting these epoxy products with polyhydric phenols, such as resorcinol, catechol, hydroquinone, 4,4'-dihydroxy diphenyl sulfone, the alkyl bisphenols such as 4,4'-dihydroxy diphenyl propane, the A or B stage phenol-aldehyde condensates, and the like. The phenolic hydroxyl groups may be present on one or more aromatic rings, and the molecules containing them may also contain other functional groups reactive with oxirane oxygen. Further, the polyhydric phenols may be selected for their ability to crosslink among themselves with or without such added ingredients as hexamethylenetetramine, thereby augmenting the thermosetting reaction between the phenols and the epoxy containing polymer.

In curing the epoxy condensation products of this invention with polyhydric phenols, as with the other curing agents described herein, the selection of the curing agent depends somewhat on the ultimate intended use. For example, for use in casting and potting applications, the epoxy polymer and the polyhydroxy phenol should form a pourable mixture at room or moderately elevated temperature; thus the polyhydric phenols used should either be liquid at ordinary temperature, or possess a relatively low melting point to permit mixing at room temperature or moderately elevated temperature, or be soluble in the epoxy polymer. In the case of coating resins a solvent is normally used, from which the coating is obtained by evaporation; the polyhydric phenols used are therefore those soluble in the solvent from which the coating is to be made.

The amount of polyhydric phenol used for curing the epoxy condensation product depends on the oxirane oxygen content of the epoxy polymer, the particular polyhydric phenol used, and the properties desired in the thermoset resinous product. Where complete reaction is desired, one equivalent weight of the epoxy polymer, that is, the weight of epoxy condensation product containing 16 grams of oxirane oxygen, is reacted with one equivalent weight of the polyhydric phenol. The equivalent weight of the polyhydric phenol is the molecular weight of the polyhydric phenol divided by the number of phenolic hydroxyl groups. In general, from 10 to 100% of the amount of polyhydric phenol theoretically required for complete reaction, is used to cure the novel epoxy resins of this invention. The extent of the reaction between any given epoxy polymer and the polyhydric phenol will of course affect its solvent and heat resistances, hardness and other properties, and is dependent both on the amount of oxirane oxygen in the epoxy polymer and the amount of polyhydric phenol used.

Another useful class of curing agents for the epoxy-containing diene-polyalkyl aromatic condensation polymers of this invention are the polyfunctional amines. These polyamines are primary or secondary amines, since these amines contain active hydrogen atoms, and are exemplified by such compounds as ethylene diamine, propylene diamine, diethylene triamine, tetraethylene pentamine, m-phenylene diamine, iminobis-propylamine, triethylene tetramine, methyl piperazine, dimethyl piperazine, and many other simple and complex polyfunctional amines, which may also contain functional groups in addition to amino groups, both to react with the epoxy polymer and to impart particular properties to the cured product. As previously discussed, for casting resins it is preferred to employ polyamines which either are liquid at ordinary temperatures or possess a relatively low melting point; and in the case of coating resins the polyamines used are those soluble in the solvent from which the coating is made.

The amount of primary or secondary polyamines used for curing these epoxy polymers depends, as before, on the degree of epoxidation of the diene-polyalkylaromatic condensation polymer, and the particular polyamine used. One equivalent weight of epoxy polymer, that is, the weight of epoxy polymer containing one atom of oxirane oxygen may theoretically be reacted with one equivalent weight of the polyamine. The equivalent weight of the polyamine is defined as the molecular weight of the polyamine divided by the number of amino groups in the polyamine. In practice, useful products are obtained from the reaction of from 10% to 100% of the theoretical amount of primary or secondary polyamines with the novel epoxidized condensation products described herein, to provide a new and useful class of cured resins.

These amine curing formulations may be catalyzed, if desired, by small amounts of such catalysts as strong carboxylic acids, Lewis acid, phenols, tertiary amines and quaternary ammonium compounds, to provide shorter cure cycles and rapid development of mechanical strength. Typical catalysts for amine cure include benzyldimethylamine, triethylamine, boron trifluoride, phenol, glycolic acid, and many others.

The resins of this invention may also be cured with urea-formaldehyde and substituted urea-formaldehyde resins, normally of low molecular weight. Urea-formaldehyde resins containing amino and hydroxyl groups are usually used in solution because of their high viscosities. These urea-formaldehyde resins usually require elevated temperatures for complete reaction with the epoxy-containing diene-aromatic resins of this invention, and are of special usefulness in forming coatings. More soluble, substituted urea-formaldehyde resins, such as low molecular weight ethylurea-formaldehyde resins, may be used without a solvent to provide useful cured products without the need for elevated curing temperatures. These resins are of substantial interest and utility as film-forming agents for coating applications.

Lewis acids are also usable as curing agents, both free Lewis acids and Lewis acid complexes where an unshared pair of electrons from a nitrogen or oxygen-containing compound are complexed to the unfilled octet of the Lewis acid. In general, the complexed Lewis acids are used in applications requiring reduced activity or extended pot lives where the cure formulations must be storable for long periods at low temperatures prior to use. The Lewis acid complexes decompose on heating to release the Lewis acids. Suitable complexes are boron trifluoride-etherates, boron trifluoride-triethanol amine, aluminum chloride-piperidine, zinc chloride-monoethanol amine, zinc chloride-acetone complexes, and many other complexes of this type. Lewis acids, both free and complexed, tend to cause self-condensation of the epoxy groups even at low concentrations. These materials are also of value, when used in small amounts, as catalysts for amine, acid, and anhydride curing formulations. In general, between 0.1 and 10 parts by weight of Lewis acid or Lewis acid complex is used per 100 parts of resin, although, for some applications requiring very short or very long cure cycles or in applications requiring relatively soft or very hard cured products, larger or small amounts may be employed.

Polymercaptans containing a multiplicity of hydrosulfide groups are also reactive with the epoxy resins of this invention. In general, these materials react somewhat slowly at room temperature and require curing at elevated temperatures or catalysts such as Lewis acids, glycolic acid, butylphosphate, stannous octoate, benzyldimethylamine, or other acidic or basic catalysts, for complete reaction. The cured products thus obtained, because of their sulfide linkages, show excellent adhesion to most metals, plastics and rubbers. A particularly useful curing agent of this type is a liquid "Thiokol" polysulfide rubber.

With all of these curing systems, the amount of curing agent employed is based on that theoretically required to react with the epoxy groups in the polymer, and may vary within wide limits, depending on the amount of epoxy oxygen present, on whether or not complete reaction and cross-linking is required, and on the particular properties desired in the cured product.

The components of the various compositions of this invention may be combined in any convenient way. With complex curing systems, any two or more curing components may be premixed prior to blending into the resin, which itself may contain one or more cure agents. Alternately one or more cure agents may be blended with the resin prior to addition of any remaining cure agents.

Care should be taken, however, if it is desired to use a curing agent of high melting point, since the necessary mixing temperature for homogeneity may substantially shorten the pot life of the combination. On the other hand, it has been found that the viscosity of the mixture is lowered as the curing agents are added, thereby permitting the use of larger amounts of curing agents, or those of higher molecular weights, while retaining the free-flowing properties of the composition. It is also possible to use solvents or diluents to lower the viscosity of the mixture and thus permit combination of components at lower temperatures.

To obtain a homogeneous mixture, it is often convenient to melt solid curing agents, and raise the temperature of the epoxy resin enough to allow addition of the curing agent without precipitation. The temperature of the mix may then be lowered to room temperature, where gelation may or may not occur, depending on the curing agents used.

Mixing of the components should of course be carried out at temperatures below their reaction temperatures. When a peroxide is used in the curing formulation, it should be so selected that it does not decompose at the temperatures at which it is desired to prepare and, if necessary, store the composition before curing.

Many variations in curing procedure are possible. The curing time varies of course with the starting materials and the curing temperature. In general, a reaction period of one to six hours at 25°–200° C. is sufficient, although longer periods are sometimes required for maximum properties, especially at temperatures approaching room temperature. At temperatures above about 300° C., charring may occur due to the exothermic nature of the curing reactions.

The products of this invention are useful in a variety of ways, as in potting and encapsulating of electronic assemblies and other casting applications, in laminates and in protective coatings and other resinous applications, either alone or in combination with other resins. They are particularly useful in applications requiring superior weatherability and chemical resistance. They may be combined with glass fibers or other reinforcing agents, with plasticizers, flexibilizers, fillers, extenders, pigments and dyes, and many other materials, for specific applications.

Exemplified below are certain specific embodiments of this invention, designed to illustrate but not to limit the novel methods and compositions described herein. All parts are by weight unless otherwise indicated. Mechanical properties were determined according to standard ASTM procedures.

Example 1

A mixture of 400 grams of meta-xylene, 300 ml. of benzene and 200 ml. of sodium dispersion, prepared by dispersing about 30% by weight of sodium in benzene, was charged under nitrogen to an autoclave, sealed and heated to 90° C. The gases were vented, and to the autoclave was charged a total of 1000 parts of butadiene under 15 p.s.i.g. The temperature was maintained at about 90° C., and the pressure at 10 to 15 p.s.i.g., during addition of the butadiene. After all the butadiene had been added the reaction was continued for 30 minutes, and the reaction mixture was cooled to room temperature and quenched into excess water. The aqueous phase was discarded, and the oil phase was neutralized, washed, and stripped of solvent. The residue was a fluid copolymer oil having a viscosity at 25° C. of 75 centistokes, or about 70 centipoises, and an iodine number of 313. The copolymer yield was about 1400 grams.

Five hundred grams of this copolymer were dissolved in an equal weight of benzene and mixed with 90 grams of glacial acetic acid and 210 grams of a strong cation exchange resin (Dowex 50W–X12, 50–100 mesh, a sulfonated polystyrene cross-linked with 12% divinyl benzene). This mixture was agitated, warmed to 60° C. and 350 grams of 50% aqueous hydrogen peroxide were added to it over a period of 30 minutes. The reaction mixture was held at 60–65° C. for an additional six hours and then cooled, filtered free of ion exchange resin and neutralized. The oil phase was separated, washed with water, dried and distilled free of solvent, to leave a light yellow oil containing 8.1% oxirane oxygen and having a viscosity of 34 poises at 25° C.

Example 2

One hundred parts of the epoxidized copolymer of Example 1 were mixed with 31 parts of maleic anhydride and four parts of propylene glycol and heated for two hours at 100° C. A transparent tack-free rubbery composition was produced having considerable toughness and elasticity. Further postcuring at 155° C. for 24 hours resulted in a clear, light amber-colored, rigid product having an ASTM heat distortion temperature of 98° C. and a Rockwell M hardness of 100.

Example 3

A mixture of 750 parts of benzene, 16 parts of sodium and 131 parts of a commercial mixed xylene containing 25% ortho xylene, 46% meta xylene, 20% para xylene and 9% ethylbenzene was heated in an autoclave to 90° C. and to it was added a total of 326 parts of butadiene under 15 p.s.i.g. After the butadiene had been absorbed as revealed by a drop in pressure to about 3 p.s.i.g. the reaction mixture was quenched and neutralized, the oil phase was separated off, washed with water and epoxidized at 65° C. with a mixture of 45 parts of 90% formic acid, 9 parts of phosphoric acid and 360 parts of 50% aqueous hydrogen peroxide. The hydrogen peroxide was added over a period of two hours. After an additional six hours of reaction, a viscous product was obtained which contained 6.75% oxirane oxygen and had a viscosity of 1,546 poises at 25° C.

Example 4

One hundred parts of the epoxidized copolymer prepared in Example 3 were heated at 80° C. with 80 parts of hexahydrophthalic anhydride, four parts of propylene glycol and 0.05 part formic acid as curing catalyst. After 3.5 hours a tough, rubbery product was produced, which cured to a hard, tough infusible material after 3 hours postcure at 155° C., having flexural strength of 15,770 p.s.i. and tensile strength of 7,690 p.s.i.

Example 5

One hundred parts of the epoxidized copolymer of Example 3 were blended with 30 parts of styrene, 40.3 parts of maleic anhydride, 5.2 parts of ethylene glycol and 0.65 part of dicumyl peroxide. A rubbery tack-free product resulted after heating for 3 hours at 80° C. After an additional three hours at 155° C., the ASTM flexural and tensile strengths of the product were 17,720 p.s.i. and 8,000 p.s.i., respectively, and the Rockwell M hardness was 105.

Example 6

Seventy parts of the epoxidized product of Example 3 were blended with 30 parts of styrene, then mixed with 0.5 part of dicumyl peroxide and 40 parts of a viscous liquid adduct prepared by reacting 30 parts of maleic anhydride with 30 parts of diethylene glycol at 100° C. for three hours. This mixture was precured at 80° C. for two hours to a rubbery tack-free state, and then postcured at 155° C. for three hours. A hard, tough product was obtained having a Rockwell M hardness of 109 and flexural and tensile strengths of 17,000 p.s.i. and 8,890 p.s.i., respectively.

Example 7

A copolymer of butadiene and xylene was prepared as in Example 3 using 16 parts of sodium, 180 parts of butadiene and 66 parts of commercial mixed xylenes. After workup and removal of solvent a clear red copolymer oil was obtained having a viscosity at 25° C. of 3.0 poises and an iodine number of 323. One hundred parts of this copolymer were dissolved in 200 parts of chloroform and epoxidized at 30–40° C. by adding, over a period of about 4 hours, 190 parts of 40% peracetic acid to which had been added 20 grams of sodium acetate as buffer. The reaction mixture was washed with water, and the solvent removed by distillation from the oil phase. The product had an oxirane oxygen content of 6.0% and a viscosity of 2,000 poises at 25° C.

Example 8

One hundred parts of the epoxidized product of Example 7 were cured with 35 parts of citraconic anhydride, 5 parts of 2,3-butylene glycol and 0.5 part of dicumyl peroxide. The time required at 80° C. to produce a non-tacky rubbery state was two hours. The rubbery product was then postcured at 155° C. for 3 hours to form a product having a Rockwell M hardness of 104 and flexural and tensile strengths of 14,690 p.s.i. and 7,730 p.s.i., respectively. The heat distortion temperature after 24 hours postcure was 156° C.

Example 9

Butadiene, 954 parts, was copolymerized as in Example 1 with 200 parts of para-xylene. The solvent-free copolymer product was a dark red oil having an iodine number of 337 and a viscosity at 25° C. of 18 poises. One hundred parts of this copolymer were dissolved in 100 parts of benzene and epoxidized at 65° C. using ten parts of formic acid, two parts of phosphoric acid and 80 parts of 50 percent hydrogen peroxide. The epoxidized product was a very viscous orange-colored oil containing 7.4 percent oxirane oxygen and having a viscosity at 25° C. of about 27,000 poises.

Example 10

One hundred grams of the epoxidized product of Example 9 were cured using 100 parts of alpha-phenethyl-succinic anhydride and four parts of glycerol. Upon heating this mixture for one hour at 100° C., a very adhesive tough, rubbery product was obtained which hardened to a very tough, hard, infusible product when postcured at 155° C. for an additional three hours.

Example 11

A mixture of 100 parts of meta-xylene, 500 parts of benzene and 12 parts of sodium dispersed in an equal weight of kerosene was heated in an autoclave to 90° C., and to this was charged a total of 200 parts of liquid isoprene. After 1.5 hours at 85–90° C., the reaction mixture was quenched into excess water and the aqueous phase was discarded. The oil phase was neutralized, washed free of inorganic salts and stripped free of solvent. The residue was a fluid copolymer oil of about 90 centipoises viscosity at 25° C., having an iodine number of 222. One hundred parts of this copolymer, as a 40% solution in benzene, were mixed with 10 parts of formic acid and 1 part of phosphoric acid. This mixture was agitated, warmed to 65° C., and 85 parts of 50% aqueous hydrogen peroxide were added over a period of 30 minutes. The reaction mixture was held at 65° C. for an additional two and one half hours and then cooled, washed and neutralized. The oil phase was separated, washed with water, dried and distilled free of solvent, to yield an oil containing 8.2% oxirane oxygen and having a viscosity of 105 poises at 25° C.

*Example 12*

One hundred parts of the epoxidized copolymer of Example 11 were mixed with 24 parts of meta-phenylenediamine and cured by heating for four hours at 105° C. A hard, tough solid was produced, which exhibited marked adhesion to metals.

*Example 13*

Butadiene, 230 parts, was copolymerized as in Example 3 with 200 parts of commercial mixed xylenes, to give a yellow copolymer oil having a viscosity of 1 poise at 25° C. and an iodine number of 317. One hundred parts of this copolymer were dissolved in an equal weight of benzene and epoxidized at 65° C. by slowly adding a solution of ten parts of formic acid, one part of phosphoric acid and 90 parts of 50% hydrogen peroxide, over a period of 2 hours. The resulting product was cooled and neutralized; the oil phase was separated, washed with water, dried and distilled free of solvent. The solvent-free epoxidized copolymer was a light yellow liquid having an oxirane oxygen content of 7.9% and a viscosity of 42 poises at 25° C.

*Example 14*

Fifty parts of the product of Example 13 were mixed with 25 parts of meta-xylylenediamine and two parts of phenol and heated for 24 hours at 120° C. A very hard, strong infusible solid product was produced, which formed very tenacious adhesive bonds when cured in contact with glass, aluminum, steel, wood or concrete.

*Example 15*

One hundred parts of the epoxidized copolymer of Example 13 were mixed with 20 parts of triethylenetetramine and three parts of glycolic acid. This mixture was degassed, and heated for 15 hours at 80° C., at which time a tough, rubbery, product was obtained which postcured rapidly to a hard, infusible resin on heating at 155° C. After four hours of postcure at 155° C., the product exhibited a flexural strength of 16,500 p.s.i., tensile strength of 8,700 p.s.i. and a Rockwell M hardness of 94.

*Example 16*

One hundred parts of the epoxidized copolymer of Example 13 was blended with 60 parts of styrene. To this blend was mixed one part of cumene hydroperoxide and 100 parts of a 2/1 molar adduct of maleic anhydride and dipropylene glycol, prepared by reacting the maleic anhydride and dipropylene glycol at 100° C. for three hours. This mixture was gelled at room temperature overnight, and was then postcured at 150° C. for four hours. The product had a flexural strength of 20,100 p.s.i., tensile strength of 9,600 p.s.i., and Rockwell M hardness of 108.

*Example 17*

A mixture of 300 parts of ortho-xylene, 1500 parts of benzene and 50 parts of sodium dispersed in an equal weight of benzene was heated in an autoclave to 90° C., and to it was added a total of 1000 parts of butadiene under 15 p.s.i.g. pressure. After the butadiene had been absorbed, as indicated by a drop in pressure, the reaction mixture was quenched into excess water and the aqueous phase was discarded. The oil phase was neutralized, washed free of inorganic salts and stripped free of solvent. The residue was a fluid copolymer oil of about 2.5 poises viscosity at 25° C. One hundred parts of this copolymer were dissolved in an equal weight of benzene and mixed with 10 parts of formic acid and 1 part of sulfuric acid. This mixture was agitated, warmed to 65° C., and 80 parts of 50% aqueous hydrogen peroxide were added to it over a period of one and one half hours. The reaction mixture was then cooled, washed and neutralized. The oil phase was separated off, washed with water, dried and distilled free of solvent to yield a viscous liquid containing 5.7% oxirane oxygen and having a viscosity of 9,840 poises at 25° C.

*Example 18*

Fifty parts by weight of the epoxidized product of Example 17 were mixed with 15 parts of maleic anhydride and three parts of 2,3-butylene glycol and spread over 100 parts of glass fiber cloth. The resin-coated cloth was assembled into a laminate and heated for 15 hours at 150° C., to produce a very tough, hard, chemically resistant laminate characterized by excellent adhesion of resin to glass.

*Example 19*

Mesitylene and butadiene were copolymerized in the ratio of one mole mesitylene for four moles of butadiene, following the procedure of Example 1. One hundred parts of the resulting fluid copolymer were dissolved in an equal weight of benzene, and mixed with 10 parts of formic acid and 1 part of sulfuric acid. The mixture was agitated, warmed to 65° C., and 80 parts of 50% aqueous hydrogen peroxide were added over a period of one and one half hours. The reaction mixture was cooled, washed and neutralized, the oil phase was separated, washed, dried and distilled free of solvent, to produce a yellow viscous liquid analyzing 6.23% oxirane oxygen and having a viscosity of 530 poises at 25° C.

*Example 20*

One hundred parts of the product of Example 19 were cured by heating with 65 parts of bicyclo-(2.2.1)-5-methyl-5-heptene-2,3-dicarboxylic anhydride for 20 hours at 120° C. The product was a hard, tough resinous material having excellent resistance toward concentrated acids and alkalies.

*Example 21*

Butadiene was copolymerized with durene in the ratio of six moles of butadiene to one mole of durene, following the procedure of Example 1. One hundred parts of this copolymer was dissolved in 200 parts of chloroform, and epoxidized at 30–40° C. by adding, over a period of 4 hours, an aqueous solution of 190 parts of 40% peracetic and 20 grams sodium acetate. The reaction mixture was then cooled to room temperature and washed with water, and the solvent was distilled from the oil phase, to leave as product a viscous liquid containing 5.4% oxirane oxygen and having a viscosity of 900 poises.

*Example 22*

One hundred parts of the product of Example 21 were cured by heating with 80 parts of hexahydrophthalic anhydride, to give a strong, chemically resistant resin having excellent adhesion to glass.

*Example 23*

Ten parts by weight of 2,4-lutidine was copolymerized with twenty parts of butadiene, following the procedure of Example 1, to produce a dark red fluid copolymer which was partially soluble in concentrated acids. One hundred parts of this copolymer were dissolved in 200 parts of benzene, combined with 10 parts of formic acid and 2 parts of phosphoric acid, and heated to 65° C. To this mixture was added 80 parts of 50 percent hydrogen peroxide, over a two hour period. The reaction mixture was held at 65° C. for an additional four hours, then cooled and the product separated, washed and distilled free of solvent. The product had an oxirane oxygen content of 4.8% and a viscosity of about 100 poises at 25° C.

*Example 24*

One hundred parts of the epoxy product of Example 23 were mixed with 100 parts of phthalic anhydride and heated at 100° C. for 30 hours. A dark colored tough product was obtained having excellent adhesive properties.

*Example 25*

A mixture of 300 parts of dimethylnaphthalene, 1000 parts of benzene and 53 parts of sodium dispersed in an equal weight of benzene was heated in an autoclave to 90° C. A total of 700 parts of butadiene was charged, under 10-15 pounds per square inch gauge pressure. After the butadiene had been absorbed the reaction mixture was quenched into excess water and the aqueous phase was discarded. The oil phase was neutralized, washed free of inorganic salts and stripped free of solvent. The residue was a viscous copolymer oil. A mixture of 100 parts of this copolymer, 200 parts of chloroform, 15 parts of glycolic acid and 1 part of phosphoric acid was heated to 60° C., and 75 parts of 50% hydrogen peroxide were added over 30 minutes. The reaction mixture was maintained at 60-65° C. for an additional 3 hours, then neutralized and washed. The oil phase was separated, washed and dried, and after removal of the solvent by vacuum distillation yielded a dark viscous product which contained 6.35% oxirane oxygen.

*Example 26*

When 100 parts of the product of Example 25 were mixed with 20 parts of diethylene triamine and 5 parts of resorcinol and heated for 5 hours at 100° C., a hard, tough resin was obtained which showed excellent adhesion to a variety of plastics and metals.

*Example 27*

One hundred parts of a butadiene-xylene copolymer prepared as in Example 1 were dissolved in 200 parts of toluene and mixed with 25 parts of sodium acetate. This mixture was agitated and heated to 50° C. Two hundred and thirty parts of 39% peracetic acid were added over a period of 1 hour. The reaction mixture was held at 50° C. for an additional 1 hour, and then cooled and neutralized. The oil phase was separated, washed with water, dried and distilled free of solvent, to yield an almost colorless oil containing 9.0% oxirane oxygen and having a viscosity of 50 poises at 25° C.

*Example 28*

One hundred parts of the product of Example 27 were mixed with 100 parts of alpha-phenethylsuccinic anhydride, 4 parts propylene glycol and 0.5 part benzyldimethylamine. After heating for 3 hours at 100° C., the product had cured to a non-tacky, machinable rubber. After an additional 4 hours at 155° C., the product had a flexural strength of 16,460 p.s.i., tensile strength of 9,640 p.s.i. and Rockwell (M) hardness of 87.

*Example 29*

Fifty parts of the epoxidized copolymer of Example 27 were blended with 50 parts of styrene, 100 parts of a condensate prepared by heating 2 moles of maleic anhydride with 1 mole of diethylene glycol at 120° C. for 2 hours, and 2 parts of cumene hydroperoxide. After heating for three hours at 100° C. and 4 hours at 155° C. the cured product had a flexural strength of 20,430 p.s.i. and tensile strength of 10,760 p.s.i., and Rockwell (M) hardness of 111.

*Example 30*

One hundred parts of the epoxidized copolymer of Example 27 were blended with 20 parts of diethylene triamine and 5 parts of resorcinol. After curing two hours at 100° C. and 4 hours at 155° C., the product exhibited a flexural strength of 19,920 and a tensile strength of 10,270 p.s.i., and Rockwell (M) hardness of 101.

*Example 31*

A mixture of 400 grams of meta-xylene, 1000 ml. of benzene, and 40 grams of finely divided lithium dispersed in an equal weight of isoctane, was charged under nitrogen to an autoclave, sealed and heated to 90° C. The gases were vented, and to the autoclave was charged a total of 1000 parts of butadiene under 15 p.s.i.g. The temperature was maintained at about 90° C., and the pressure at 10 to 15 p.s.i.g., during addition of the butadiene. After all the butadiene had been added the reaction was continued for one hour at 90-95° C., and the reaction mixture was cooled to room temperature and quenched into excess water. The aqueous phase was discarded, and the oil phase was neutralized, washed and stripped of solvent. The copolymer thus obtained was dissolved in an equal weight of chlorobenzene and epoxidized with 1000 grams of 42% peracetic acid at 30-35° C. The epoxidized product, after workup and removal of solvent, analyzed 7.5% oxirane oxygen.

*Example 32*

One hundred parts of the epoxidized product of Example 31 were heated with 50 parts of glycolic acid at 100° C. for 4 hours. A hard, strong, chemically resistant resin was obtained.

*Example 33*

One hundred parts of the epoxidized copolymer prepared in Example 30 were heated at 125° C. with 75 parts of adipic acid and two parts of dibutyl phosphate. After six hours a tough, flexible product was produced, which showed excellent resistance to thermal shock.

*Example 34*

Fifty parts of the epoxidized product of Example 30 were mixed with six parts of a 1.1 molar complex of boron trifluoride and triethanol amine. This mixture was stable for several days at room temperature, during which time it did not change appreciably in viscosity. Upon heating this mixture to about 120° C., a rapid, exothermic reaction was observed which produced a hard, tough adhesive product.

*Example 35*

One hundred parts of the epoxidized product of Example 30 were mixed with 100 parts of alpha-phenethylsuccinic anhydride and four parts of aluminum trichloride-acetone complex. After standing at room temperature for about five minutes, a rapid exothermic reaction set in and the entire mass quickly hardened into a tough, infusible solid.

It is apparent that this invention is susceptible to numerous modifications within the scope of the disclosure, and it is intended to include such variations within the scope of the following claims.

We claim:
1. The oxirane-containing polymer of a liquid condensation product of a conjugated aliphatic diene of four to eight carbon atoms with a nuclearly substituted polyalkyl aromatic compound, said condensation product having a multiplicity of diene units attached to the alkyl groups of the aromatic compound and being formed by the condensation of a molar excess of two to eighteen moles of diene per mole of aromatic compound, said polymer containing at least 1% by weight oxirane oxygen based on the weight of the polymer.
2. The polymer of claim 1 wherein the condensation of the diene and the aromatic compound is conducted in the presence of an alkali metal catalyst and said polymer contains about 4% to 10% oxirane oxygen by weight.

3. The polymer of claim 1 wherein the diene is butadiene and the aromatic compound is xylene, the condensation having been conducted in the presence of sodium.

4. The polymer of claim 1, wherein the diene is butadiene.

5. The polymer of claim 1, wherein the diene is isoprene.

6. The polymer of claim 1, wherein the polyalkyl-substituted aromatic compound is a polymethyl naphthalene.

7. The polymer of claim 1, wherein the polyalkyl-substituted aromatic compound is xylene.

8. The polymer of claim 1, wherein said polyalkyl-substituted aromatic compound is mesitylene.

9. The polymer of claim 1, wherein said polyalkyl-subbstituted aromatic compound is durene.

10. The polymer of claim 1, wherein said polyalkyl-substituted aromatic compound is lutidine.

References Cited by the Examiner

UNITED STATES PATENTS

| | | | |
|---|---|---|---|
| 1,934,123 | 11/1933 | Hoffman et al. | 260—168 |
| 2,448,641 | 9/1948 | Whitman | 260—666 |
| 2,603,655 | 7/1952 | Strain | 260—486 |
| 2,624,726 | 1/1953 | Sernuik | 260—94.2 |
| 2,670,390 | 2/1954 | Pines et al. | 260—668 |
| 2,826,569 | 3/1958 | Cislak | 260—94.2 |
| 2,959,531 | 11/1960 | Wheelock | 260—94.7 |
| 3,073,796 | 1/1963 | Reich et al. | 260—94.7 |

OTHER REFERENCES

Canadian Journal of Research, vol. 26B, 1948, pp. 657–667.

MURRAY TILLMAN, *Primary Examiner.*

WILLIAM H. SHORT, JAMES A. SEIDLECK,
*Examiners.*